US008897211B2

(12) United States Patent
Benco et al.

(10) Patent No.: US 8,897,211 B2
(45) Date of Patent: Nov. 25, 2014

(54) SYSTEM AND METHODS FOR PROVIDING SERVICE-SPECIFIC SUPPORT FOR MULTIMEDIA TRAFFIC IN WIRELESS NETWORKS

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Alcatel Lucent, Boulogne-Billancourt (FR)

(*) Notice: Subject to any disclaimer, the term of this patent is extended or adjusted under 35 U.S.C. 154(b) by 1480 days.

(21) Appl. No.: 11/824,328

(22) Filed: Jun. 29, 2007

(65) Prior Publication Data
US 2009/0003363 A1 Jan. 1, 2009

(51) Int. Cl.
*H04Q 7/00* (2006.01)
*H04L 29/06* (2006.01)
(52) U.S. Cl.
CPC .......... *H04L 65/1043* (2013.01); *H04L 65/103* (2013.01)
USPC ....................................................... 370/328
(58) Field of Classification Search
USPC .................. 370/352, 389, 401, 236, 231; 455/67.11, 466, 436, 426, 552, 445, 455/405, 422; 709/226, 219, 206, 203, 204; 725/62; 719/322
See application file for complete search history.

(56) References Cited

U.S. PATENT DOCUMENTS

| | | | | |
|---|---|---|---|---|
| 5,519,689 A | * | 5/1996 | Kim | 370/232 |
| 5,625,845 A | * | 4/1997 | Allran et al. | 719/322 |
| 6,223,211 B1 | * | 4/2001 | Hamilton et al. | 709/203 |
| 6,778,661 B1 | * | 8/2004 | Yumoto et al. | 379/265.09 |
| 7,319,847 B2 | * | 1/2008 | Xanthos et al. | 455/67.11 |

(Continued)

*Primary Examiner* — Hassan Phillips
*Assistant Examiner* — Prenell Jones
(74) *Attorney, Agent, or Firm* — Carmen Patti Law Group, LLC (57) ABSTRACT

A system for providing service-specific support for multimedia traffic in a telecommunications system comprises a subscriber terminal, a base station operatively coupled to the subscriber terminal, a mobile switching center (MSC) operatively coupled to the base station, a media gateway control function (MGCF) and a media gateway (MGW), each coupled to the MSC. The subscriber terminal is adapted to generate multimedia traffic of at least one service category, wherein the multimedia traffic may be any of several distinct types defined within the service category. The subscriber terminal is further adapted to identify, when establishing a connection to the MSC to carry multimedia traffic, the type of that traffic in a connection request message. The MSC is adapted to further identify, when establishing a connection between the MSC and the MGCF/MGW to carry multimedia traffic, the type of that traffic in a message, responsive to the identification of the traffic type in the connection request message. The MGCF/MGW are adapted to identify, when converting, reformatting, or encapsulating multimedia traffic into a form to be carried over a packet network (for example, in TCP segments), the type of traffic being carried. The MGCF, MGW, or MSC may optionally perform service-specific processing on the multimedia traffic responsive to the traffic type indicator. When multimedia traffic is delivered to a destination network for ultimate delivery to a destination endpoint, an MGCF/MGW may reverse the effects of prior service-specific processing.

20 Claims, 5 Drawing Sheets

(56) References Cited

U.S. PATENT DOCUMENTS

| | | | |
|---|---|---|---|
| 7,346,370 B2* | 3/2008 | Spaur et al. | 455/556.1 |
| 7,353,313 B2* | 4/2008 | Wehage et al. | 710/305 |
| 7,373,500 B2* | 5/2008 | Ramelson et al. | 713/150 |
| 7,688,820 B2* | 3/2010 | Forte et al. | 370/389 |
| 7,720,094 B2* | 5/2010 | Turner et al. | 370/465 |
| 7,729,301 B2* | 6/2010 | Salmi | 370/310 |
| 7,774,456 B1* | 8/2010 | Lownsbrough et al. | 709/224 |
| 8,566,473 B2* | 10/2013 | Ajanovic et al. | 709/234 |
| 2001/0036173 A1* | 11/2001 | Shmulevich et al. | 370/352 |
| 2003/0026241 A1* | 2/2003 | Ono et al. | 370/349 |
| 2003/0126263 A1* | 7/2003 | Fenton et al. | 709/226 |
| 2003/0224809 A1* | 12/2003 | Savinen et al. | 455/466 |
| 2004/0001479 A1* | 1/2004 | Pounds et al. | 370/352 |
| 2004/0028010 A1* | 2/2004 | Harris et al. | 370/329 |
| 2004/0054725 A1* | 3/2004 | Moller et al. | 709/204 |
| 2004/0076131 A1* | 4/2004 | Qu et al. | 370/335 |
| 2004/0090970 A1* | 5/2004 | Sanchez et al. | 370/397 |
| 2004/0223513 A1* | 11/2004 | Meago | 370/468 |
| 2004/0259553 A1* | 12/2004 | Delaney et al. | 455/445 |
| 2005/0176445 A1* | 8/2005 | Qu et al. | 455/458 |
| 2005/0198211 A1* | 9/2005 | Park et al. | 709/219 |
| 2005/0265318 A1* | 12/2005 | Khartabil et al. | 370/352 |
| 2006/0098627 A1* | 5/2006 | Karaoguz et al. | 370/352 |
| 2006/0098670 A1* | 5/2006 | Voit et al. | 370/401 |
| 2006/0161554 A1* | 7/2006 | Lucovsky et al. | 707/10 |
| 2006/0165103 A1* | 7/2006 | Trudeau et al. | 370/401 |
| 2006/0173965 A1* | 8/2006 | Yang | 709/206 |
| 2006/0176878 A1* | 8/2006 | Han | 370/389 |
| 2006/0233333 A1* | 10/2006 | Brombal et al. | 379/114.2 |
| 2006/0270447 A1* | 11/2006 | Everson et al. | 455/552.1 |
| 2007/0055995 A1* | 3/2007 | Jiang | 725/62 |
| 2007/0100951 A1* | 5/2007 | Bae | 709/206 |
| 2007/0121596 A1* | 5/2007 | Kurapati et al. | 370/356 |
| 2007/0140223 A1* | 6/2007 | Bhatia et al. | 370/352 |
| 2007/0195802 A1* | 8/2007 | Kallio et al. | 370/401 |
| 2007/0291695 A1* | 12/2007 | Sammour et al. | 370/331 |
| 2008/0096553 A1* | 4/2008 | Saksena et al. | 455/426.2 |

* cited by examiner

FIG. 1

CDMA ConnectionRequest Message

Fig. 2

```
MEGACO/1
[123.123.123.4]:55555
Transaction = 10003 {
    Context = $ {
        Add = A4444,
        Add = $ {
            Media {
                Stream = 1 {
                    LocalControl {
                        Mode = ReceiveOnly,
                    },
                    Local {
                        v=0
                        c=IN IP4 $
                        m=bepd $ SMS/TXT 96
                    }
                }
            }
        }
    }
}
```

Example H.248/MEGACO Add Command

Fig. 4

```
TerminationID
[,MediaDescriptor]
[,ModemDescriptor]
[,MuxDescriptor]
[,EventsDescriptor]
[,SignalsDescriptor]
[,DigitMapDescriptor]
[,ObservedEventsDescriptor]
[,EventBufferDescriptor]
[,StatisticsDescriptor]
[,PackagesDescriptor]
Add( TerminationID
[, MediaDescriptor]
[, ModemDescriptor]
[, MuxDescriptor]
[, EventsDescriptor]
[, EventBufferDescriptor]
[, SignalsDescriptor]
[, DigitMapDescriptor]
[, AuditDescriptor]
)
```

H.248 Add Command Format

Fig. 3

TCP Header Format

Fig. 5

| Kind | Length | Meaning |
|------|--------|---------|
| 0 | - | End of option list. |
| 1 | - | No-operation. |
| 2 | 4 | Maximum segment size. |
| 3 | 1 | Traffic Type.<br><br>00: VoIP<br>01: SMS<br>02: e-mail<br>03: compressed video<br>04: raw video |

TCP Options Format

SYSTEM AND METHODS FOR PROVIDING SERVICE-SPECIFIC SUPPORT FOR MULTIMEDIA TRAFFIC IN WIRELESS NETWORKS

TECHNICAL FIELD

This invention relates generally to telecommunications systems, and more particularly to wireless telecommunications networks adapted to provide service-specific support for multimedia traffic, including but not limited to providing differential handling of different types of traffic.

BACKGROUND

A number of wireless telecommunications networks have been installed by common carriers to provide to subscribers a variety of wireless services, including but not limited to telephone service, video services, text messaging service, e-mail service, and the like. The various services may be grouped into broad "service categories". Each service category roughly corresponds to a group of services, the members of which employ the same fundamental transport technology through telecommunications networks and are handled similarly by the various elements of the networks. Examples of service categories include conversational voice, conversational video, push-to-talk, and "best effort" packet data ("BEPD").

It is known in conventional wireless networks to handle traffic of one service category differently from that of other service categories. For example, conversational voice traffic may be switched and transported as time-domain multiplexed (TDM) traffic, wherein network resources are allocated for each call or channel beginning at the time the call is established and continuing until its conclusion, and wherein call traffic is delivered directly to a TDM or TDM-equivalent carrier or public network by the wireless network's Mobile Switching Center (MSC). BEPD traffic, in contrast, may be switched and transported in any convenient form at early stages within the wireless network, but is eventually converted or encapsulated by an element of the wireless network into standardized packet traffic for transport through a packet network (which may include internal carrier networks, external carrier networks, and public networks such as the Internet) for ultimate delivery to an endpoint, which may, for example, be another subscriber terminal. The conversion or encapsulation of BEPD from an internal form used in early stages of the wireless network into a standard form suitable for transport over conventional packet networks is typically performed by a Media Gateway (MGW) under control of a Media Gateway Control Function (MGCF).

Although conventional wireless networks handle traffic differently depending on its service category, such networks have not heretofore differentially handled the various types of traffic within a defined service category. Service providers and subscribers could derive a number of benefits if wireless networks were able to differentially process various types of traffic within a service category. These benefits may include without limitation preferential handling of some types of traffic, compression of some types of traffic, measuring the various types of traffic, and applying different rating policies to the various types. However, in general, there is no reliable way to distinguish among the several types of traffic that may be grouped within a service category, and that is especially the case with BEPD traffic. Conventionally, no metadata or other information has been transmitted with BEPD traffic to identify the type or purpose of that traffic. Also, it is difficult, and in some cases impossible, to reliably discern the type or purpose of the traffic by inspecting the data.

Thus, a need exists for apparatus and methods enabling a wireless network to reliably differentiate among the various types of traffic within a service category and to provide service-specific support of some types of multimedia traffic.

SUMMARY

A system for providing service-specific support for multimedia traffic in a telecommunications system comprises a subscriber terminal, a base station operatively coupled to the subscriber terminal, a mobile switching center (MSC) operatively coupled to the base station, a media gateway control function (MGCF) and a media gateway (MGW), each coupled to the MSC. The subscriber terminal is adapted to generate multimedia traffic of at least one service category, wherein the multimedia traffic may be any of several distinct types defined within the service category. The subscriber terminal is further adapted to identify, when establishing a connection to the MSC to carry multimedia traffic, the type of that traffic in a connection request message. The MSC is adapted to further identify, when establishing a connection between the MSC and the MGCF/MGW to carry multimedia traffic, the type of that traffic in a message, responsive to the identification of the traffic type in the connection request message. The MGCF/MGW are adapted to identify, when converting, reformatting, or encapsulating multimedia traffic into a form to be carried over a packet network (for example, in TCP segments or packets), the type of traffic being carried. The MGCF, MGW, or MSC may optionally perform service-specific processing on the multimedia traffic responsive to the traffic type indicator. When multimedia traffic is delivered to a destination network for ultimate delivery to a destination endpoint, an MGCF/MGW may reverse the effects of prior service-specific processing.

According to a further aspect of the invention, a method is provided for use in conjunction with a system for providing service-specific support for multimedia traffic in a telecommunications system. A user initiates a call or session that employs a particular service category encompassing several possible traffic types. The subscriber terminal encodes an identification of the traffic type in a connection request message to the MSC. The MSC maps the traffic type to a parameter in the media descriptor field of an H.248/MEGACO ADD message to the MGCF. When converting, reformatting, or encapsulating multimedia traffic into a form to be carried over a packet network, the MGCF/MGW map the traffic type information encoded in the ADD message into an appropriate traffic type indicator, which may be carried in packet traffic as part of the packet or segment headers. For example, for traffic transported according to the TCP/IP protocols, the traffic type may be encoded in an option of newly-defined Kind 3, and incorporated into the segment headers. The MGCF/MGW or the MSC may perform service specific processing. The service-specific processing may be reversed, if necessary, by an MGCF/MGW element of a destination network before ultimate delivery of the traffic to the intended endpoint.

DESCRIPTION OF THE DRAWINGS

Features of example implementations of the invention will become apparent from the description, the claims, and the accompanying drawings in which:

DETAILED DESCRIPTION

Figure 1:
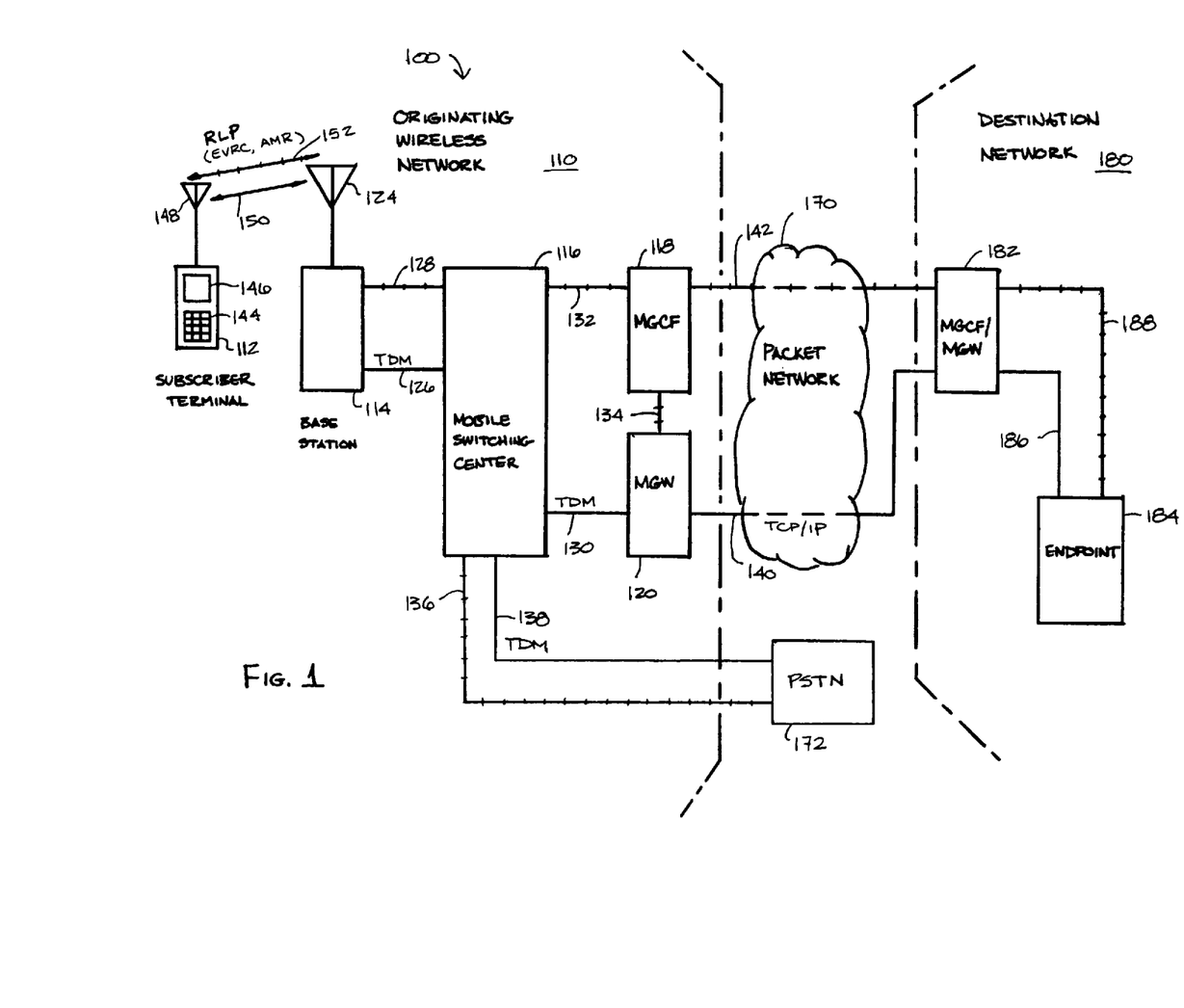
FIG. 1 is a block diagram of an exemplary embodiment of a system 100 for providing service-specific support for types of multimedia traffic within a service category.

FIG. 1 is a block diagram of an exemplary embodiment of a system 100 for providing service-specific support for types of multimedia traffic. The system 100 preferably distinguishes among the various traffic types within a service category, such as Best Effort Packet Data (BEPD).

The general arrangement and functions of the exemplary system 100 will now be described with reference to FIG. 1. These elements of exemplary system 100 are preferably interconnected, and preferably function as in known networks, with exceptions and enhancements noted herein.

The present application relates to telecommunications systems, including multimedia telecommunications systems, which may be implemented using a variety of electronic and optical technologies, including but not limited to: analog electronic systems; digital electronic systems; microprocessors and other processing elements; and software and otherwise embodied collections of steps, instructions, and the like, for implementing methods, processes, or policies in conjunction with such systems and processing elements. It will be appreciated that in the telecommunications arts, various signal leads, busses, data paths, data structures, channels, buffers, message-passing interfaces, and other communications paths may be used to implement a facility, structure, or method for conveying information or signals, and are often functionally equivalent. Accordingly, unless otherwise noted, references to apparatus or data structures for conveying a signal or information are intended to refer generally to all functionally equivalent apparatus and data structures.

As best seen in FIG. 1, the exemplary system 100 comprises an originating wireless network 110. In some embodiments, the exemplary system 100 may also comprise a packet network 170 and a destination network 180. In other embodiments, packet network 170 and destination network 180 may not be part of exemplary system 100, but may operate cooperatively with exemplary system 100 to deliver traffic generated by exemplary system 100 to an end-user.

As best seen in FIG. 1, originating wireless network 110 preferably comprises a wireless subscriber terminal 112, a wireless network base station 114, a mobile switching center (MSC) 116, a media gateway control function (MGCF) 118, and media gateway (MGW) 120. Originating wireless network 110 may employ any appropriate wireless technology. For example but without limitation, network 110 may be a "CDMA" wireless network which complies with the CDMA 2000 standard. However, one of skill in the art will appreciate that the teachings of the present application could be applied to other types of wireless networks (perhaps with modifications within the ken of a skilled artisan) without departing from the spirit of the present invention.

Subscriber terminal 112 may be any suitable subscriber terminal, including without limitation a portable "telephone" handset, a wireless-enabled Personal Digital Assistant, a computer equipped with a Wide-Area Network interface compatible with network 110, or any other appropriate subscriber terminal. Subscriber terminal 112 preferably includes a suitable input device 144, a suitable display device 146, an antenna 148, and appropriate control and radio equipment (not shown) for controlling the terminal and peripherals and for communicating with elements of network 110.

Wireless network base station 114 may be any suitable base station compatible with network 110 and subscriber terminal 112. For example, base station 114 may be implemented as a model ModCell 4.0 base station commercially available from Alcatel-Lucent, whose principal U.S. address is 600 Mountain Ave., Murray Hill, N.J. 07974. Other base stations could also be used. Base station 114 preferably includes an antenna 124 and appropriate control and radio equipment (not shown) for controlling the base station and peripherals and for communicating with other elements of network 110. Subscriber terminal 112 communicates with base station 114 via a radio link including a subscriber-terminal-to-base-station bearer path 150 and a subscriber-terminal-to-base-station signaling path 152, using a radio link protocol (RLP). Bearer traffic may include digitized voice traffic encoded using any suitable vocoder, including without limitation the EVRC and AMR vocoders. Bearer traffic may also include traffic in other forms, including conversational video, BEPD, and the like. Bearer traffic may be in any suitable form which can be transported and processed within network 110, and this may include a variety of types of data carried over or encapsulated on standard TDM facilities or links. Although bearer and signaling paths 150, 152 are shown separately, bearer and signaling content may be carried over the same radio link. Among its functions, the base station 114 provides a radio interface between the MSC 116 and subscriber terminals.

Mobile switching center (MSC) 116 may be any appropriate mobile switching center compatible with base station 114 and other elements of network 110. For example, MSC 116 could be implemented as a model AUTOPLEX 1000 MSC, commercially available from Alcatel-Lucent, whose principal U.S. address is 600 Mountain Ave., Murray Hill, N.J. 07974. Other MSC products could also be used. Base station 114 communicates with MSC 116 via a base-station-to-MSC bearer path 126 and a base-station-to-MSC signaling path 128. Although base station 114 is present as an intermediary between subscriber terminal 112 and MSC 116, all three of these elements may be considered to be operatively connected or coupled to one another. MSC 116 provides a variety of services in network 110, including without limitation switching circuit-switched voice calls, authenticating users, forwarding interoffice circuit-switched voice calls to other switches or networks, and forwarding traffic other than circuit-switched voice calls to other elements of network 110.

The media gateway control function (MGCF) 118 may be any appropriate MGCF compatible with MSC 116, MGW 120, and other elements of network 110. For example, MGCF 118 could be implemented as a model LCP 1800 MGCF, commercially available from Alcatel-Lucent, whose principal U.S. address is 600 Mountain Ave., Murray Hill, N.J. 07974. Other MGCF products could also be used. The principal function of MGCF is to control the media gateway (MGW) 120. MGCF 118 communicates with MSC 116 via a MSC-to-MGCF signaling path 132, and communicates with MGW 120 via MGCF-to-MGW control path 134. MGCF 118 communicates with packet network 170, and ultimately MGCF/MGW 182 of destination network 180, via packet network signaling path 142.

The media gateway (MGW) 120 may be any appropriate media gateway compatible with MSC 116, MGCF 118, and other elements of network 110. For example, MGW 120 could be implemented as a model Plexus Gateway 7510, commercially available from Alcatel-Lucent, whose principal U.S. address is 600 Mountain Ave., Murray Hill, N.J. 07974. Other MGW products could also be used. The principal functions of the MGW 120 include, but are not limited to, converting multimedia traffic between formats and protocols used internally in network 110 and formats and protocols used by devices or networks external to the originating wireless network 110, such as packet network 170 and destination network 180. MGW 120 communicates with MSC 116 via a MSC-to-MGW bearer path 130 and communicates with MGCF 118 via control path 134. MGW 120 communicates with packet network 170, and ultimately MGCF/MGW 182 of destination network 180, via packet network bearer path 140.

Packet network 170 may be any suitable packet network. Preferably, packet network 170 is implemented as one or more interconnected networks employing standard protocols, including but not limited to TCP/IP, to which networks at least one destination network 180 is also interconnected. Packet network 170 could be implemented, at least in part, by a captive or internal network of the carrier which operates network 110. Packet network 170 could also be implemented, at least in part, by a network of another carrier. Further, packet network 170 could also be implemented, at least in part, by the public Internet.

As is known in the art, MSC 116 distinguishes between traffic of various service categories. For example, circuit-switched or TDM voice traffic originating in network 110 is typically delivered by MSC 116 either to an endpoint in network 110 (not shown), or to a destination in another circuit-switched or TDM network, such as the public switched telephone network (PSTN) 172. MSC 116 communicates with PSTN 172 via MSC-to-PSTN bearer path 136 and MSC-to-PSTN signaling path 138. The MSC 116 generally delivers "multimedia" traffic originating in network 110 via MGCF 118 and MGW 120, packet network 170, destination network 180, to an endpoint such as 184. The term "multimedia" traffic is intended herein to refer generally to traffic originating in network 110 that would be processed by media gateways such as 120 and 182, and be delivered via packet network 170, in contrast to circuit-switched voice traffic, which generally is not processed by a media gateway and is delivered to endpoints via a circuit-switched or TDM network.

Destination network 180 may be implemented as any appropriate network which is adapted for communication with packet network 170, includes a desired endpoint such as endpoint 184 to which "multimedia" traffic from originating wireless network 110 may be delivered, and includes a MGCF/MGW 182 for translating or converting between the formats or protocols of packet network 170 and the formats or protocols required by endpoint 184. MGCF/MGW 182 communicates with endpoint 184 via destination network bearer path 186 and destination network signaling path 188. Although only a single destination network 180 and a single destination network endpoint 184 are depicted in FIG. 1, it will be appreciated that a practical embodiment of system 100 might include or be connected to numerous destination networks, and each destination network may have numerous endpoints. In some cases, the originating network 110 may also function as the destination network 180.

According to an aspect of the present invention, exemplary system 100 preferably is adapted to differentially process various types of traffic within a service category to provide service-specific support therefor. Service providers and subscribers may derive a number of benefits from this capability. For example, service providers might wish to distinguish among different types of traffic to allow those types of traffic to be measured, to aid in capacity planning or other analyses, or to apply different rating policies to the various services. Some traffic, such as Voice over IP (VoIP) or Push-to-Talk traffic might benefit from preferential transport or processing to improve Quality of Service (QOS); conversely, some traffic might be deemed of lower priority and could be abandoned when the network is congested. Some traffic might be subject to compression, the type of which may be selected to match the requirements of the traffic being processed.

According to an aspect of the invention, in order to distinguish among various traffic types of a particular service category, such as BEPD, information describing the traffic type is generated in the originating network element, such as the subscriber terminal 112, and propagated through network 110, at least until any necessary service-specific processing steps have been completed. In some cases, the information describing the traffic type is propagated until the traffic is delivered to an endpoint 184 in the destination network 180. The following discussion of the generation and propagation of traffic type information is provided in the context of traffic in the BEPD service category. However, one of skill in the art will appreciate how to apply the concepts described herein to traffic in other service categories.

Figure 2:
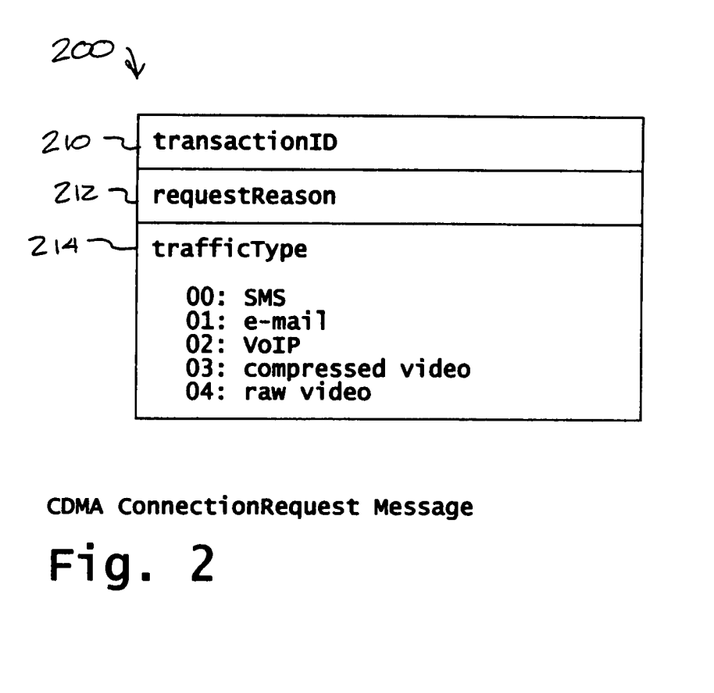
FIG. 2 is a diagram depicting an exemplary arrangement 200 of a CDMA ConnectionRequest message, adapted for use with the system 100, for identifying a type of traffic to be carried by a connection within the system 100 of FIG. 1.

When subscriber terminal 112 produces BEPD content that is to be delivered to a destination endpoint 184, the subscriber terminal 112 sets up a connection using a CDMA ConnectionRequest message which is transmitted to the base station 114 and forwarded to the MSC 116. FIG. 2 is a diagram depicting an exemplary arrangement of a CDMA ConnectionRequest message 200 which is extended to identify the type of traffic to be carried by the connection. This message is part of the Radio Link Protocol (RLP) between the subscriber terminal 112 and the base station 114; the RLP information is passed from the base station 114 to the MSC 116 in a non-standardized message. As is known, a field 210 of message 200 contains a Transaction ID, sometimes referred to as a "flow ID", which identifies a particular connection. The Transaction ID also identifies the service category of the connection. As the connection progresses through the network 110, the Transaction ID is propagated with it to allow the connection to be tracked and the service category to be determined by subsequent network elements. As is known, a field 212 contains a Request Reason which identifies whether the connection was initiated in the subscriber terminal 112 or in the network.

A new field 214 contains a Traffic Type parameter, which identifies which type of BEPD traffic is to be carried by this connection. For example, field 214 may contain a one-octet parameter, and different values of the parameter may identify different types of BEPD traffic. As best seen in FIG. 2, a Traffic Type of 00 may identify SMS traffic; a Traffic Type of 01 may indicate e-mail traffic; and so forth. The mention of the assignment of particular Traffic Type numerical codes to specific traffic types is merely an example; additional traffic types, and other parameter formats and assignments of codes to traffic types could also be used. The information of field 214 is generally stored in memory or other data storage facility in the subscriber terminal 112 during preparation and transmission of the message, and stored in memory or other data storage facility in the base station 114 or the MSC 116 during reception and processing or interpretation of the message.

As previously described, BEPD traffic connections are set up by the subscriber terminal 112 using a CDMA connection-Request message as part of the Radio Link Protocol, and the information contained in that message is passed to the MSC 116. The MSC 116 extends the BEPD traffic to the MGW 120 by establishing a connection using the H.248/MEGACO protocol. In order to accomplish this, the MSC 116 transmits an H.248 ADD message to MGCF 118. The function of the ADD message is to add a termination to a context. The ADD message effectively describes an endpoint at which the connection will be terminated, and describes certain parameters of the connection.

Figure 3:
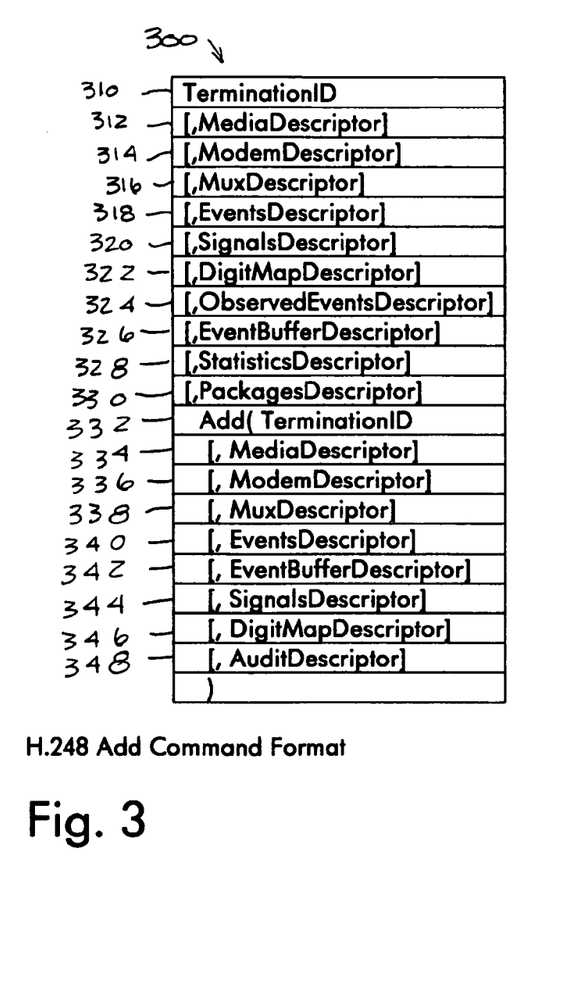
FIG. 3 is a diagram depicting the general arrangement 300 of an "ADD" command of the H.248/MEGACO protocol, adapted for use with the system 100, for describing the content type of a media stream to be supported by an H.248 termination within the system 100 of FIG. 1.

FIG. 3 is a diagram depicting the general arrangement 300 of an "ADD" command of the H.248/MEGACO protocol. Parameters 310, 312, 314, 316, 318, 320, 322, 324, 326, 328, 330, 332, 336, 338, 340, 342, 344, 346, and 348 may generally be used in the same manner as in conventional wireless systems.

According to an aspect of the present invention, the MediaDescriptor parameter 334 of the H.248/MEGACO ADD message is preferably extended to support specification of the types of traffic which may be generated by subscriber terminal 112 and which may have been identified in the CDMA ConnectionRequest message 200 depicted in FIG. 2. Because the particular means of specifying or encoding the traffic type in the MediaDescriptor parameter 334 may differ from that used to identify the traffic type in the CDMA Connection Request message 200, MSC 116 maps the traffic type identified in message 200 to the corresponding traffic type encoding for the MediaDescriptor parameter 334. In general, the MediaDescriptor parameter 334 incorporates indicia specifying the service category of the traffic (e.g., "bepd" for best-effort packet data), a delimiter, and indicia further specifying the particular type of traffic to be carried (e.g., "SMS/TXT 96" for short text message traffic).

Figure 4:
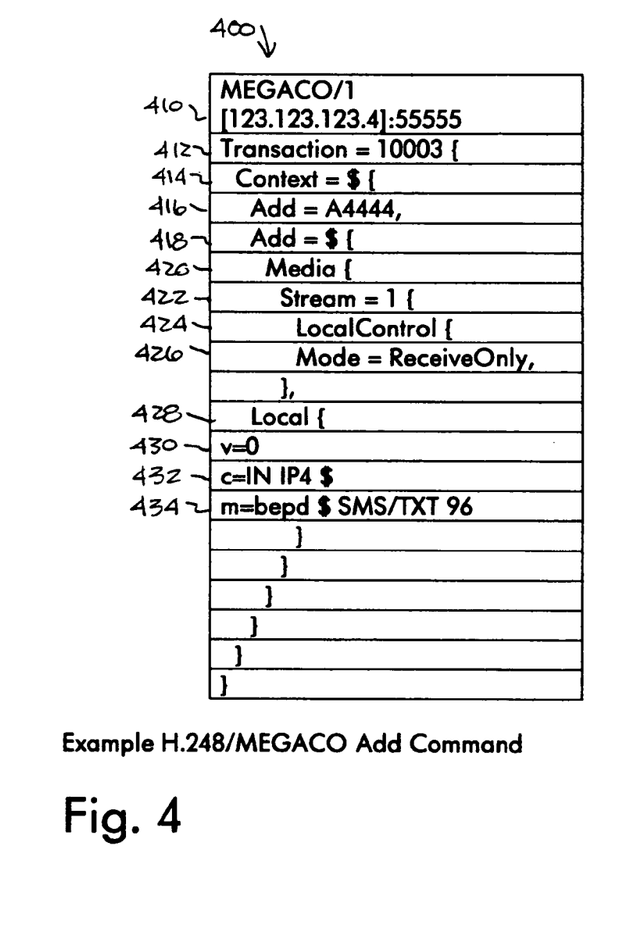
FIG. 4 is a diagram depicting the arrangement 400 of an exemplary "ADD" command of the H.248/MEGACO protocol, adapted for use with the system 100 of FIG. 1, and depicting a specific media descriptor describing the content type of a media stream.

FIG. 4 depicts the arrangement of an exemplary H.248/MEGACO ADD command 400 containing a MediaDescriptor parameter extended according to an aspect of the present invention to specify a traffic type of SMS/TXT. The ADD command 400 may generally be constructed in the same manner as in conventional wireless systems. Elements 410, 412, 414, 416, and 418 are constructed conventionally. The MediaDescriptor parameter includes elements 420-434, and of those, elements 420, 422, 424, 426, 428, 430, and 432 are also constructed conventionally. According to an aspect of the present invention, element 434 is extended to specify a traffic type of "SMS/TXT 96", in addition to the conventional service category ("bepd"). The traffic type of "SMS/TXT 96" is one example of the traffic types which may be specified in element 434. Indicia may be defined for any other traffic types which may be generated by the subscriber terminal 112 in the BEPD service category.

The following table depicts an exemplary mapping between trafficTypes which may be specified in the CDMA Connection Request message 200 of FIG. 2, and the traffic type element 434 (FIG. 4) of the MediaDescriptor parameter 334 (FIG. 3) of the H.248/MEGACO ADD command. Other mappings, and additional Traffic Type-MediaDescriptor mappings, could also be used.

| Description | Traffic Type | MediaDescriptor |
|---|---|---|
| SMS | 00 | SMS/TXT 96 |
| E-mail | 01 | EMAIL/TXT 97 |
| VoIP | 02 | VOIP/G729 98 |
| Video (compressed) | 03 | VIDEO/MPV 99 |
| Video (raw) | 04 | VIDEO/H261 100 |

The information of element 434 is generally stored in memory or other data storage facility in the MSC 116 during preparation and transmission of the message, and stored in memory or other data storage facility in the MGCF 118 or MGW 120 during reception and processing or interpretation of the message.

As previously described, multimedia traffic that is handled within the BEPD service category is generally transported via a packet network 170 for delivery to an endpoint 184 on a destination network 180. Such multimedia traffic is forwarded by MSC 116 to MGW 120, which may convert, reformat or encapsulate the traffic so that it may be carried via the packet network 170.

In addition to reformatting or encapsulating the multimedia traffic, the MGW 120 may perform service-specific processing of the traffic. Service-specific processing may also be performed by other elements of network 110. Service specific processing may include but is not limited to any differential handling of traffic, and a variety of side effects of handling the traffic, including reporting, measurement, peg-counting, billing, rating, or other peripheral activities.

For example, MGW 120 might apply compression to certain types of traffic to reduce the cost of transport or to allow more traffic to be carried over a facility. Moreover, MGW 120 may apply different modes of compression depending on the traffic type. It may be tolerable, for example, to apply lossy compression to video traffic, while lossless compression would be required for e-mail or some other content. As another example of service-specific processing, MGW 120 may send traffic of certain types over facilities or networks providing higher reliability, better Quality-of-Service, or lower latency. As yet another example of service-specific processing, MGW 120 or MGCF 118 may measure or count traffic of certain types to allow for rating, billing, or engineering activities. Any service-specific processing that alters the form or content of traffic must be compatible with the MGCF/MGW 182 of destination network 180 in order that the content may be converted into a form usable by endpoint 184. Moreover, it may be necessary to change or remap the traffic type identification of the multimedia traffic if service-specific processing, such as compression, has changed the traffic type such that the identification is no longer consistent with the actual traffic type.

According to an aspect of the present invention, the header format of the packet network protocol, such as TCP/IP, into which the multimedia traffic is converted, reformatted, or encapsulated, is extended to incorporate an indicator of the traffic type. The traffic type indicator enables the MGCF/MGW 182 of destination network 180, or other downstream network elements, to apply service-specific processing, including but not limited to reversing the effects of service-specific processing earlier performed on the traffic. For example, if compression was applied to the traffic by MGW 120 of originating wireless network 110, the traffic may be decompressed by MGCF/MGW 182 before the traffic is delivered to the endpoint 184.

Figure 5:
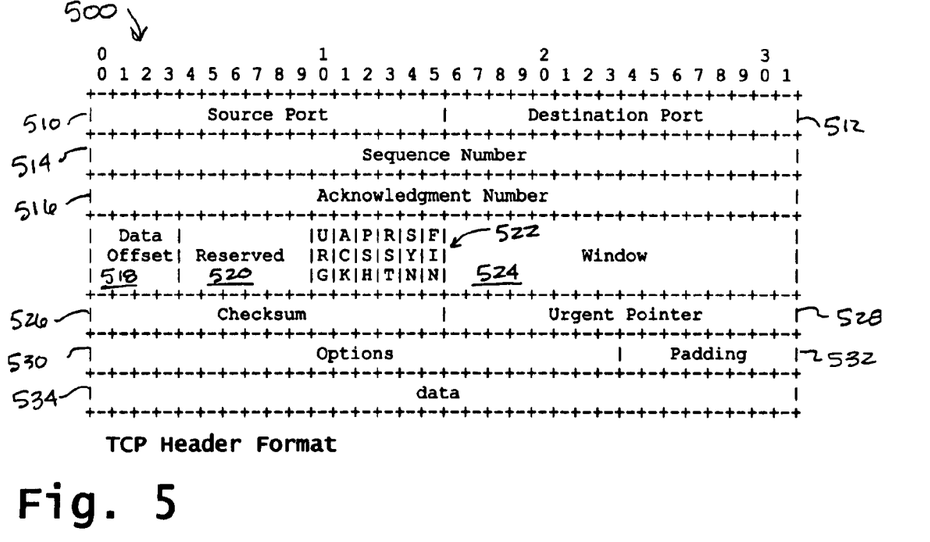
FIG. 5 is a diagram depicting the general arrangement 500 of the header information of a packet in the Transmission Control Protocol (TCP), adapted for use with the system 100 of FIG. 1.

FIG. 5 is a diagram depicting the general arrangement 500 of the header information of a segment in the Transmission Control Protocol (TCP). MGW 120 may generally construct TCP segment headers by using header elements 510, 512, 514, 516, 518, 520, 522, 524, 526, 528, 532, and data element 534 in a manner similar to their use in conventional networks. According to an aspect of the present invention, the options element 530 of the TCP header is preferably extended in function to include an option parameter "Kind" that accommodates an indication of the type of traffic contained in the segment.

Figure 6:
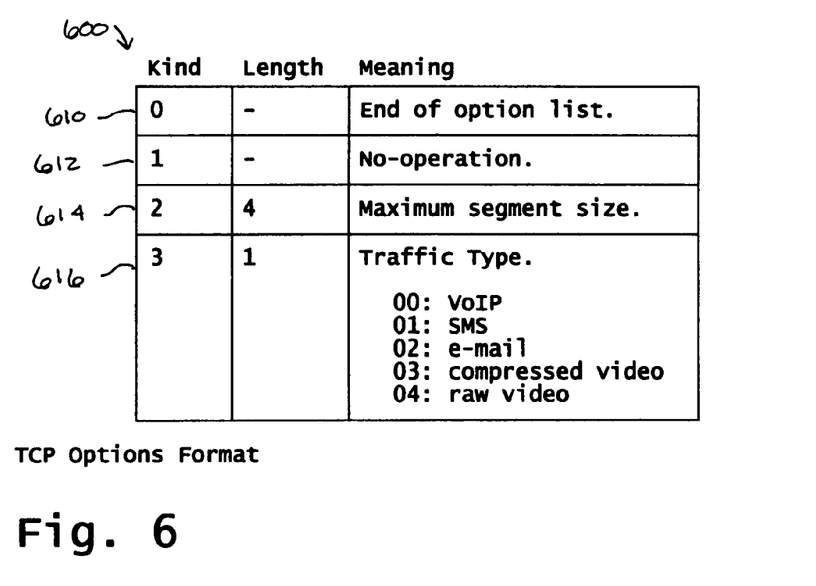
FIG. 6 is a diagram depicting the arrangement 600 of an exemplary extension to the option field of the TCP header, adapted for use with the system 100 of FIG. 1 for identifying the type of traffic to be carried in the packet.

FIG. 6 is a diagram depicting the arrangement 600 of an exemplary extension to the option field of the TCP header for identifying the type of traffic to be carried in the segment. There are three existing option Kinds, identified as "0", "1", and "2", defined in the TCP standard. Option strings may vary in length and start with at least one octet that defines the "Kind" of the option. The length of an option string depends on its Kind, and on an optional length field. As best seen in FIG. 6, options of Kind 0 (row 610) and Kind 1 (row 612) contain only the Kind octet. Options of Kind 2 (row 614) include a Kind octet, a length octet, plus a four-octet word indicating the maximum segment size.

A new option of Kind 3 (row 616) is preferably defined to allow an indication of the traffic type in the header of each segment. Options of Kind 3 contain the Kind octet, a length octet, and an additional octet encoding the traffic type. For example but not limitation, VoIP traffic may be encoded as traffic type 0; short message service (SMS) e-mail traffic may be encoded as type 2; compressed video traffic may be encoded as type 3; and raw video traffic may be encoded as type 4. Other encodings, and encodings of additional traffic types, could also be used. The MGW 120 and MGCF 118 preferably use the MediaDescriptor parameter of the H.248/MEGACO ADD command to determine the type of traffic being carried, and map that to an appropriate one of the traffic types which may be encoded in option Kind 3 in the TCP header. The mapping of the actual traffic type to a numerical traffic type code in the TCP header may differ from the mapping used earlier to encode traffic type in CDMA Connection Request message and the encoding of similar information in the H.248/MEGACO ADD command. Although packet network 170 is described herein, for example, in terms of a network employing the TCP/IP protocols, networks employing other technologies and protocols could also be used. In that case, the traffic type would preferably be similarly encoded, for example, in a header field of packets, segments, or other units of data, although the particular mapping of traffic type to an encoded parameter may vary from that used for the TCP/IP protocols.

Multimedia traffic converted, reformatted, or encapsulated into TCP/IP segments (or data units of other appropriate protocols), and marked with a traffic type, is routed to packet network 170 for delivery to destination network 180 and endpoint 184. Destination network 180 preferably includes a MGCF/MGW 182 which may optionally convert, reformat, or de-encapsulate multimedia traffic from TCP into another form for use by endpoint 184. Alternatively, endpoint 184 may be able to accept traffic in TCP form directly. MGCF/MGW 182 may also reverse the effect of any service-specific processing applied by MGCF 118 and MGW 120 of originating wireless network 110. Depending on the topology and function of destination network 180, other network elements, such as an MSC, a base station, or other elements (not shown) may be required in order to deliver the multimedia traffic to endpoint 184.

The information of the traffic type option string 530, 616 is generally stored in memory or other data storage facility in the MGCF 118 or MGW 120 during preparation and transmission of the packet, and stored in memory or other data storage facility in elements of packet network 170 and destination network 180 during reception and processing or interpretation of the packet.

Figure 7:
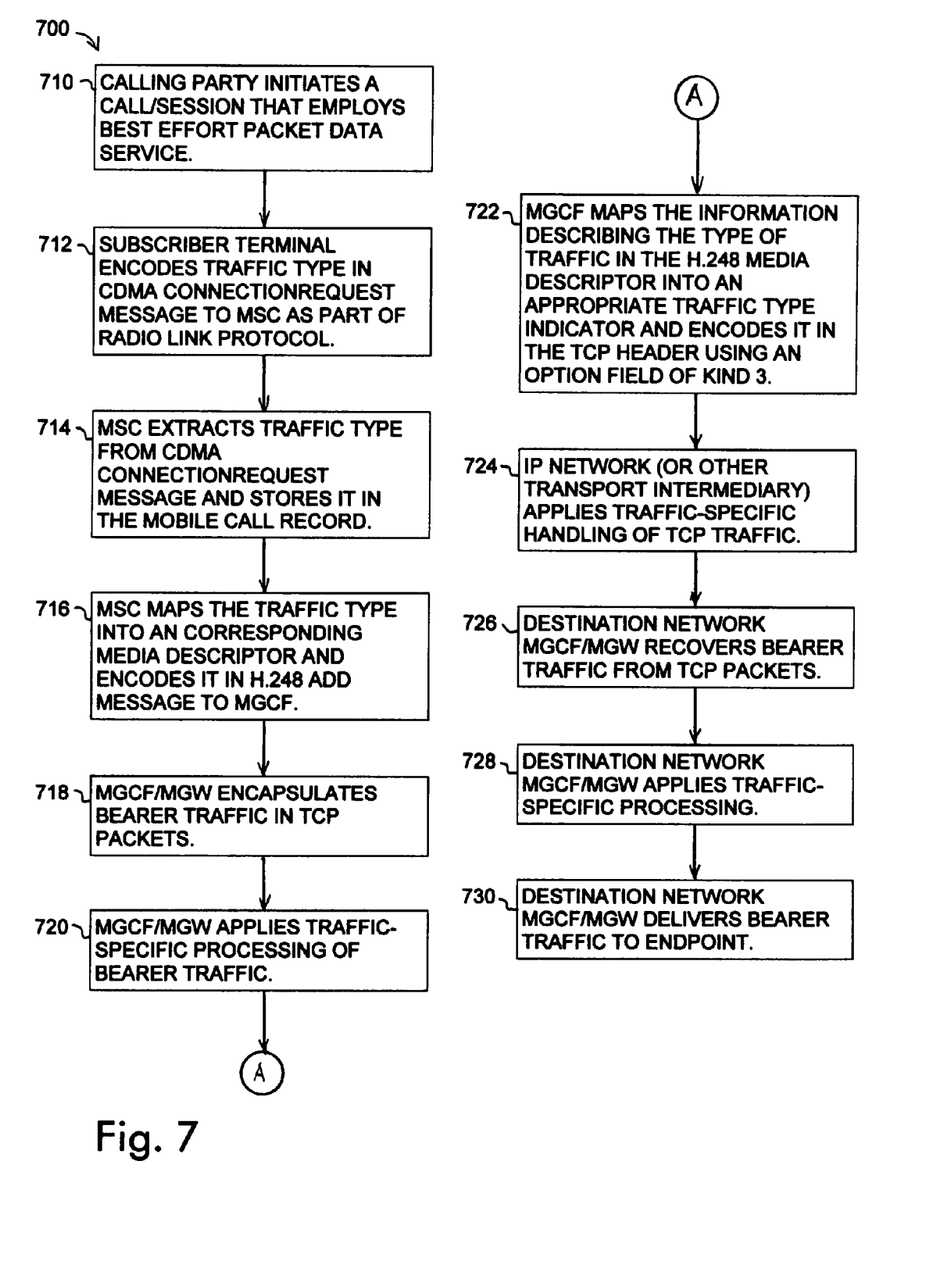
FIG. 7 is a flow diagram depicting an exemplary method 700 for use in conjunction with the system 100 of FIG. 1 for distinguishing among various types of traffic within a service category and for providing service-specific support for some types of multimedia traffic.

FIG. 7 is a flow diagram depicting an exemplary method 700 for use in conjunction with the system 100 of FIG. 1 for distinguishing among various types of traffic within a service category and for providing service-specific support for some types of multimedia traffic. The term "step" is used herein to refer to both the general steps associated with method 700 and to more detailed substeps which may be comprised as part of a more general step. Some steps are optional.

In step 710, a calling party uses the subscriber terminal 112 to initiate a call/session that generates multimedia traffic to be handled in the Best Effort Packet Data ("BEPD") service category. In step 712, the subscriber terminal 112 encodes a particular Traffic Type of the multimedia traffic in a CDMA ConnectionRequest message to the MSC as part of Radio Link Protocol. Ordinarily, a base station initially receives and forwards the message to the MSC. Although the discussion of step 710 is in the context of traffic in the BEPD service category, one of skill in the art will appreciate how to apply the concepts described herein to traffic in other service categories.

In step 714, the MSC extracts the Traffic Type from the CDMA ConnectionRequest message and optionally may store it in the Mobile Call Record. In step 716 the MSC maps the Traffic Type into a corresponding Media Descriptor and encodes it in an H.248/MEGACO ADD message to the MGCF. The message effectively defines the termination to which the multimedia traffic will be delivered. Optionally, the MSC might perform service-specific processing on the traffic.

In step 718, the MGW 120, under control of the MGCF 118, encapsulates bearer traffic in TCP packets. In an optional step 720, the MGW 120 or MGCF 118 may apply service-specific processing of the bearer traffic. In step 722, the MGCF maps the information describing the type of traffic in the H.248 Media Descriptor into an appropriate Traffic Type indicator and encodes it (or furnishes it to MGW for encoding) in the TCP header using an Option Field of Kind 3. The particular encoding of the Traffic Type may vary if a network employing different transport technologies or protocols is used. The order of steps 718, 720, and 722 may vary. The traffic is preferably routed to the packet network 170.

In an optional step 724, the packet network 170 (or other transport intermediary) applies service-specific handling of TCP traffic based on the Traffic Type encoded in option fields of Kind 3 in the TCP headers. The packet network 170 delivers the traffic to destination network 180.

In an optional step 726, the destination network MGCF/MGW recovers bearer traffic from TCP segments. This step is optional, because network elements in some networks may be adapted to accept data in TCP format (or another packet network protocol or format) directly. In an optional step 728, the destination network MGCF/MGW may apply service-specific processing. This step is optional because in some cases, there may be no service-specific processing required at this stage in the propagation of the traffic. For example, no earlier service-specific processing may have occurred, or there may be no need to reverse prior service-specific processing because such processing did not alter the payload, or if the payload was altered, the endpoint is adapted to accept the payload in its altered form. In step 730, the destination network MGCF/MGW delivers bearer traffic to the endpoint. Portions of method 700 may be repeated to allow additional traffic to be delivered without establishing new sessions, connections, contexts or the like.

The steps or operations described herein are just for example. There may be many variations to these steps or operations without departing from the spirit of the invention. For instance, the steps may be performed in a differing order, or steps may be added, deleted, or modified.

The embodiments described herein are exemplary. Thus it will be appreciated that although the embodiments are described in terms of specific technologies, other equivalent technologies could be used to implement systems in keeping with the spirit of the present invention.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
    a subscriber terminal;
    said subscriber terminal being adapted to produce multimedia traffic of at least one of a plurality of service types encompassed in a defined service category;
    said subscriber terminal being further adapted to send a message for a mobile switching center of a wireless network to initiate a session to carry said multimedia traffic;
    wherein said message comprises a transaction ID, which identifies the service category of the session, and further comprises a traffic type parameter, which identifies a type of said multimedia traffic for the service category of the session;
    said subscriber terminal being further adapted to identify said type of multimedia traffic for differential processing of said multimedia traffic by the wireless network to provide service-specific support therefor.

2. The apparatus of claim 1 wherein said message transmitted by said subscriber terminal is a connection request message formatted according to the CDMA Radio Link Protocol, and said subscriber terminal is adapted to identify the type of said multimedia traffic by incorporating an indicium of said type of said multimedia traffic in a traffic type field of said message.

3. A method comprising the steps of:
    receiving a first message to initiate a session to carry multimedia traffic produced by a subscriber terminal, said multimedia traffic being of at least one of a plurality of service types encompassed in a defined service category, wherein said first message comprises a transaction ID, which identifies the service category of the session and further comprises a traffic type parameter, which identifies a type of said multimedia traffic for the service category of the session; and
    processing some types of said multimedia traffic differently from other types of said multimedia traffic responsive to said first message to provide service-specific support to multimedia traffic within a service category.

4. The method of claim 3 wherein the step of receiving comprises:
    receiving the first message at a mobile switching center;
    the method further comprising the step of:
    said mobile switching center identifying the type of said multimedia traffic in a second message transmitted to at least one of the group consisting of said media gateway and a control function for said media gateway.

5. The method of claim 4 further comprising the step of:
    said mobile switching center mapping the traffic type of said multimedia traffic identified in said first message from said subscriber terminal to a media descriptor element of a second message in the H.248 protocol.

6. The method of claim 4 further comprising the step of:
    said mobile switching center processing some types of said multimedia traffic differently from other types of said multimedia traffic responsive to said first message.

7. The method of claim 3 wherein the step of receiving comprises:
    receiving the first message at a media gateway from a mobile switching center;
    the method further comprising the step of:
    said media gateway identifying the type of said multimedia traffic in packets containing said multimedia traffic transmitted to a packet network.

8. The method of claim 7 further comprising the step of:
    said media gateway applying compression to some types of said multimedia traffic, responsive to said first message from said mobile switching center.

9. The method of claim 7 further comprising the step of:
    said media gateway applying a measurement process to some types of said multimedia traffic responsive to said first message from said mobile switching center.

10. An apparatus, comprising:
    a mobile switching center (MSC) of a wireless network;
    said MSC being adapted to receive a first message to initiate a session to carry multimedia traffic produced by a subscriber terminal;
    said multimedia traffic being of at least one of a plurality of service types encompassed in a defined service category;
    wherein said first message comprises a transaction ID, which identifies the service category of the session, and further comprises a traffic type parameter, which identifies a type of said multimedia traffic for the service category of the session;
    said MSC being further adapted to identify said type of said multimedia traffic for differential processing of said multimedia traffic by the wireless network to provide service-specific support therefor.

11. The apparatus of claim 10 wherein said mobile switching center is adapted to identify the type of said multimedia traffic in a second message transmitted to at least one of the group consisting of said media gateway and a control function for said media gateway, responsive to said first message.

12. The apparatus of claim 2 wherein said second message transmitted by said mobile switching center is formatted according to H.248 protocol, and said mobile switching center is adapted to identify the type of said multimedia traffic by incorporating an indicium of said type of said multimedia traffic in a media descriptor element of said second message.

13. The apparatus of claim 10 wherein said mobile switching center applies compression to some types of multimedia traffic, responsive to said first message.

14. The apparatus of claim 10 wherein said mobile switching center applies a measurement process to some types of multimedia traffic, responsive to said first message.

15. An apparatus, comprising:

a media gateway of a wireless network;

said media gateway being adapted to receive a first message, from a mobile switching center of the wireless network, to initiate a session to carry multimedia traffic produced by a subscriber terminal, said first message describing said multimedia traffic;

said multimedia traffic being of at least one of a plurality of service types encompassed in a defined service category;

wherein said first message comprises a transaction ID, which identifies the service category of the session, and further comprises a traffic type parameter, which identifies a type of said multimedia traffic for the service category of the session;

said media gateway being further adapted to identify said type of said multimedia traffic for differential processing of said multimedia traffic by the wireless network to provide service- specific support therefor.

16. The apparatus of claim 15 wherein said media gateway is adapted to identify the type of said multimedia traffic in data units containing said multimedia traffic transmitted to a packet network, responsive to said first message from said mobile switching center.

17. The apparatus of claim 16 wherein said media gateway processes some types of said multimedia traffic differently from other types of said multimedia traffic, responsive to said first message from said mobile switching center.

18. The apparatus of claim 16 wherein said data units transmitted to said packet network are formatted according to Transmission Control Protocol, and said media gateway is adapted to identify the type of said multimedia traffic by incorporating an indicium of said type of said multimedia traffic in an option field of a header of said Transmission Control Protocol.

19. The apparatus of claim 17 wherein said media gateway applies compression to some types of multimedia traffic, responsive to said first message from said mobile switching center.

20. The apparatus of claim 17 wherein said media gateway applies a measurement process to some types of multimedia traffic, responsive to said first message from said mobile switching center.

* * * * *